(12) United States Patent
Crider et al.

(10) Patent No.: US 9,738,257 B1
(45) Date of Patent: *Aug. 22, 2017

(54) VEHICLE MONITORING SYSTEM

(71) Applicant: CRIDER BUSH, LLC, Birmingham, AL (US)

(72) Inventors: Grant W. Crider, Cullman, AL (US); Erik D. Arendall, Cullman, AL (US); Kenneth M. Bush, Birmingham, AL (US)

(73) Assignee: CRIDER BUSH, LLC, Birmingham, AL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/291,751

(22) Filed: Oct. 12, 2016

Related U.S. Application Data

(63) Continuation of application No. 14/885,518, filed on Oct. 16, 2015, now Pat. No. 9,475,462, which is a
(Continued)

(51) Int. Cl.
*B60R 25/10* (2013.01)
*B60R 25/24* (2013.01)
(Continued)

(52) U.S. Cl.
CPC ............ *B60R 25/241* (2013.01); *B60K 35/00* (2013.01); *B60R 25/102* (2013.01);
(Continued)

(58) Field of Classification Search
CPC ....... B60R 25/04; B60R 25/252; B60R 25/24; B60R 25/241; B60R 25/10
(Continued)

(56) References Cited

U.S. PATENT DOCUMENTS 5,396,215 A * 3/1995 Hinkle .................... B60R 25/04
307/10.2
5,812,067 A * 9/1998 Bergholz ................ B60R 25/04
180/257
(Continued)

FOREIGN PATENT DOCUMENTS

CN 103247090 A 8/2013
WO 2011037320 A1 3/2011

*Primary Examiner* — Joseph Feild
*Assistant Examiner* — Rufus Point
(74) *Attorney, Agent, or Firm* — Bush Intellectual Property Law; Kenneth M. Bush

(57) ABSTRACT

A system for monitoring an interior of a vehicle, comprising an identification device adapted to be carried by an individual, a vehicular unit adapted for mounting within the vehicle, and a controller adapted for remote wireless communication with the unit. The unit will activate a camera and a microphone when a person is detected within the vehicle. The unit will search for the identification device and, if the identification device is not detected, the unit will activate an alarm. If the identification device is detected, the unit will compare an access code from the identification device with authorized access codes. If the access code is not found within the authorized access codes, the unit will activate an alarm. The controller is operable to display images, broadcast sounds, and display the alarm status from the unit to a user in possession of the controller.

19 Claims, 2 Drawing Sheets

Related U.S. Application Data continuation of application No. 14/735,904, filed on Jun. 10, 2015, now Pat. No. 9,187,060.

(60) Provisional application No. 62/010,629, filed on Jun. 11, 2014.

(51) Int. Cl.
  *B60R 25/30* (2013.01)
  *B60R 25/31* (2013.01)
  *B60R 25/104* (2013.01)
  *B60R 25/25* (2013.01)
  *B60R 25/102* (2013.01)
  *B60K 35/00* (2006.01)

(52) U.S. Cl.
  CPC ............ *B60R 25/104* (2013.01); *B60R 25/25* (2013.01); *B60R 25/305* (2013.01); *B60R 25/31* (2013.01); *B60R 2025/1016* (2013.01)

(58) Field of Classification Search
  USPC ........................ 340/426.1, 5.2, 5.6
  See application file for complete search history.

(56) References Cited

U.S. PATENT DOCUMENTS

| | | | |
|---|---|---|---|
| 6,002,326 A | 12/1999 | Turner | |
| 6,924,735 B2* | 8/2005 | Ueda | E05B 77/48 307/10.1 |
| 7,044,742 B2* | 5/2006 | Sumiya | G08B 25/006 340/425.5 |
| 7,109,861 B2* | 9/2006 | Rao | G08B 21/0202 340/541 |
| 7,142,696 B1* | 11/2006 | Engelsberg | B60R 16/037 340/5.6 |
| 7,286,158 B1 | 10/2007 | Griebenow | |
| 7,680,484 B2 | 3/2010 | Kauppila | |
| 8,344,849 B2* | 1/2013 | Larsson | B60R 25/25 340/426.11 |
| 8,427,291 B2* | 4/2013 | Tanaka | B60Q 9/00 340/425.5 |
| 8,725,330 B2* | 5/2014 | Failing | B60L 3/00 701/22 |
| 8,838,325 B2* | 9/2014 | Tomik | B60K 28/04 340/438 |
| 8,874,162 B2* | 10/2014 | Schrader | H04W 12/08 340/670 |
| 9,099,000 B2* | 8/2015 | Schalk | H04M 1/72538 |
| 2002/0170064 A1 | 11/2002 | Monroe et al. | |
| 2005/0273219 A1* | 12/2005 | Kitao | B60R 25/00 701/2 |
| 2006/0049921 A1* | 3/2006 | Hara | B60R 25/00 340/426.1 |
| 2007/0135978 A1 | 6/2007 | Kim et al. | |
| 2008/0252412 A1* | 10/2008 | Larsson | B60R 25/25 340/5.2 |
| 2010/0194885 A1 | 8/2010 | Plaster | |
| 2010/0207754 A1 | 8/2010 | Shostak et al. | |
| 2010/0328474 A1 | 12/2010 | Hsieh | |
| 2012/0019379 A1* | 1/2012 | Ben Ayed | G08B 13/1436 340/539.1 |
| 2012/0112897 A1 | 5/2012 | Oh et al. | |
| 2013/0295912 A1 | 11/2013 | Chen | |
| 2014/0200737 A1* | 7/2014 | Lortz | B60R 25/25 701/1 |
| 2014/0303836 A1* | 10/2014 | Phelan | B60R 25/00 701/36 |

\* cited by examiner

VEHICLE MONITORING SYSTEM

CROSS-REFERENCE TO RELATED APPLICATIONS

This application is a continuation of U.S. patent application Ser. No. 14/885,518, filed Oct. 16, 2015, which is a continuation of U.S. patent application Ser. No. 14/735,904, filed Jun. 10, 2015, now U.S. Pat. No. 9,187,060, which claims priority to U.S. Provisional Patent Application No. 62/010,629, filed Jun. 11, 2014, the disclosures of which are incorporated herein by reference.

FIELD OF THE INVENTION

The present invention is related to vehicle security and, more particularly, to systems for monitoring the interior environment of a vehicle to protect against theft, vandalism, and other unlawful activities.

BACKGROUND OF THE INVENTION

When a vehicle is unattended by the owner or operator, an unauthorized person may access the interior of the vehicle for unlawful purposes, such as theft or vandalism. For example, when a vehicle owner leaves a vehicle for service at a vehicle service center, employees of the vehicle service center may have unsupervised access to the vehicle and the owner's personal effects within the interior of the vehicle. An employee of the vehicle service center may steal personal property from the interior of the vehicle and the vehicle owner may not realize the loss until sometime later. Since there is typically no evidence to support allegations that the theft occurred at the vehicle service center, the vehicle owner must absorb the loss. Joyriding, reckless driving, or other mishandling of the vehicle by employees of the vehicle service center may also be problems. Furthermore, if the vehicle is left unattended, various persons unrelated either to the vehicle owner or to the vehicle service center may gain access to the interior of the vehicle for theft, burglary, or vandalism.

Accordingly, there is a need for improved apparatus as well as related methods for the monitoring of the interior of a vehicle.

SUMMARY OF THE INVENTION

The present invention is a system for monitoring the interior environment of a vehicle, comprising an identification device adapted to be carried by an individual, a vehicular unit adapted for mounting within the interior of the vehicle, and a controller adapted for wireless communication with the unit from a remote location.

The identification device preferably comprises data for identifying the identity of the individual and an access code. The vehicular unit preferably comprises a unit ID for identifying the unit, a sensor for detecting the presence of a person within the interior of the vehicle, a camera for capturing images of the interior of the vehicle, a microphone for capturing sounds within the interior of the vehicle, and a reader for detecting the identification device and reading the data on the identification device. The controller preferably comprises authorized access codes, a display for displaying images and other information, a speaker for broadcasting sounds, and a user input device for inputting commands to the controller.

The vehicular unit is operable to transmit the unit ID to the controller and the controller is operable to receive the unit ID from the unit and associate the unit with the vehicle. The controller is operable to transmit the authorized access codes to the unit and the unit is operable to store the authorized access codes from the controller.

The vehicular unit sensor is operable to detect the presence of a person within the interior of the vehicle. The vehicular unit is operable to activate the camera to capture images of the interior of the vehicle and to activate the microphone to capture sounds within the interior of the vehicle when the presence of a person is detected by the sensor.

The vehicular unit is further operable to activate the reader to search for the identification device within the interior of the vehicle when the presence of a person is detected by the sensor. If the identification device is not detected, the unit is operable to activate an alarm. If the identification device is detected, the unit is operable to activate the reader to read the data on the identification device and compare the access code from the identification device with the authorized access codes. If the access code from the identification device is found within the authorized access codes, the unit will not activate an alarm. If the access code from the identification device is not found within the authorized access codes, the unit will activate an alarm.

The vehicular unit is operable to transmit images from the camera, sounds from the microphone, data from the identification device, and an alarm status to the controller. The controller is operable to display the images, broadcast the sounds, and display the alarm status from the unit so that a user in possession of the controller can observe the environment within the vehicle and take any actions that are appropriate.

These and other features of the invention will become apparent from the following detailed description of the invention.

Figure 1:
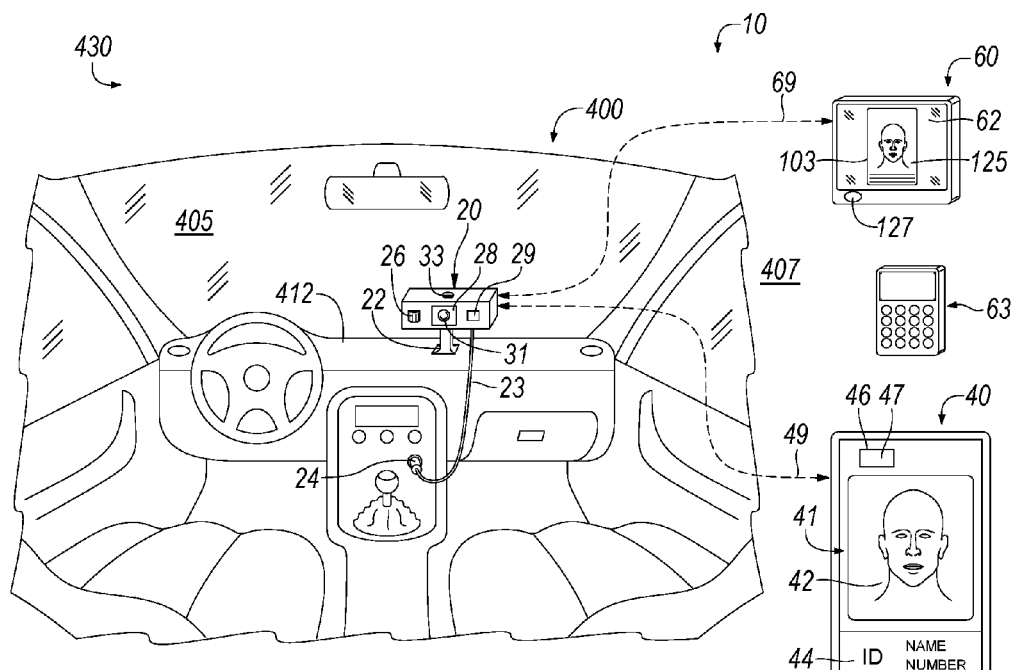
FIG. 1 illustrates by perspective view an exemplary implementation of a vehicle monitoring system in use with a vehicle.

The Figures are exemplary only, and the implementations illustrated therein are selected to facilitate explanation. The Figures including the apparatus, processes, and compositions of matter illustrated in the Figures are not to be considered limiting unless expressly so stated. For example, the components of various apparatus illustrated in the Figures may be selected for explanatory purposes, and the components may be grouped in the Figures in various ways to facilitate description, so that the apparatus may include various other components or the components may be grouped in various other ways, in other implementations. The steps in the various processes illustrated in the Figures may be performed, for example, in other orders or the steps may be divided or subdivided in various ways, in other implementations. Information flows and process flows in the Figures included herein are indicated by arrows, and it should be understood that additional information flows may occur between various components and that other process flows may occur, in various other implementations. Furthermore, the number, position, relationship and dimensions of the elements shown in the Figures to form the various implementations described herein, as well as dimensions and dimensional proportions to conform to specific force, weight, strength, flow and similar requirements are explained herein or are understandable to a person of ordinary skill in the art upon study of this disclosure. Where used in the various Figures, the same numerals designate the same or similar elements. When terms such as "top," "bottom," "right," "left," "forward," "rear," "first," "second," "inside," "outside," and similar terms are used, such terms should be understood in reference to the orientation of the implementations shown in the drawings and are utilized to facilitate description thereof. Use herein of relative terms such as generally, about, approximately, essentially, may be indicative of engineering, manufacturing, or scientific tolerances such as ±0.1%, ±1%, ±2.5%, ±5%, or other such tolerances, as would be recognized by those of ordinary skill in the art upon study of this disclosure.

DETAILED DESCRIPTION OF THE INVENTION

An apparatus comprising a vehicle monitoring system is disclosed herein that monitors the interior of a vehicle. The vehicle monitoring system may monitor the identity and activities of authorized persons who access the interior of the vehicle. The vehicle monitoring system may monitor the activities of unauthorized persons who access the interior of the vehicle and issue an alarm that may be monitored remotely.

Vehicle, as used in this disclosure, may include, for example, a car, truck, van, recreational vehicle, bus, boat, or airplane. In addition, vehicle, as used in this disclosure, may include service vehicles such as a police car, ambulance, fire truck, utilities truck, taxi, and the like.

Vehicle service center, as used in this disclosure, includes, for example, vehicle service facilities where maintenance or repair of the vehicle is performed. Vehicle service center further includes, for example, valet parking facilities, self-parking facilities, auto dealerships, vehicle storage facilities, vehicle impoundment facilities, airport, tarmac, hangar, or other airplane parking, boat mooring or anchorage, and other facilities in which personnel other than the vehicle owner may gain access to the interior of the vehicle.

As illustrated in FIG. 1, an implementation of a vehicle monitoring system 10 includes vehicular unit 20, identification 40, and controller 60. Vehicle 400, as illustrated, may be located in vehicle service center 430.

The unit 20 is removably mounted to dashboard 412 within interior 405 of vehicle 400 by base 22. In some implementations, the base 22 may rest upon dashboard 412 without further securement. In other implementations, for example, various brackets, hook and loop fasteners, insertably engageable or slidably engageable male-female engagement mechanisms, or releasable fasteners may be provided about base 22 and dashboard 412 to secure base 22 removably to dashboard 412. Unit 20 may be placed in other positions within interior 405 of vehicle in other implementations. For example, the unit 20 may be attached to the vehicle windshield with a detachable suction cup.

Unit 20, as illustrated in FIG. 1, includes power cord 23 that extends from unit 20 to interface with the electrical system of vehicle 400 via plug 24. Plug 24 may be insertably removably received in a cigarette lighter or other receptacle configured to engage plug 24 with the vehicle electrical system (not shown) of vehicle 400. With plug 24 engaged with the vehicle electrical system, electrical power may then flow from the electrical system of vehicle 400 to unit 20 via plug 24 and power cord 23 to power unit 20, in this implementation. In other implementations, electrical power may be provided to unit 20 from a battery (not shown) that may be included with unit 20.

In the implementation of FIG. 1, unit 20 includes sensor 26 adapted to detect a signal 120 (see FIG. 2) indicative of the presence of a person, such as person 41, within the interior 405 of vehicle 400. Sensor 26 may be generally oriented from the dashboard 412 toward the interior 405 of vehicle 400. The signal 120 indicative of the presence of the person within interior 405 of vehicle 400 may include the movement of the person within the interior of vehicle 400, the thermal signature (body heat) of the person, sounds generated by the person such as a voice or heartbeat, or other signals indicative of the presence of a person within interior 405 of vehicle 400 such as the interruption of a pattern of sound waves or the interruption of a pattern of laser beams.

Unit 20, in this implementation, further includes camera 28. Unit 20 may activate the camera 28 upon the detection of signal 120 by sensor 26. Upon activation, camera 28 may capture an image 103 of the interior 405 of vehicle 400. Image 103 may be a still image, a video image, or a combination of still image(s) and a video image. Lens 31 of camera 28 may be a fisheye lens, wide-angle lens, or other lens suitable for the capture of the image 103 of the interior 405 of vehicle 400 including the person within the interior 405 of vehicle 400 detected by signal 120. The image 103 may be of sufficient clarity to enable visual identification of person(s) within image 103.

Unit 20, in this implementation, further includes microphone 33 that may be activated by unit 20 upon the detection of signal 120 by sensor 26. Upon activation, microphone 33 may capture audio 113 proximate vehicle 400 including interior 405. Audio 113 may comprise a single sound event such as the shattering of window glass or audio 113 may comprise a succession of sounds accumulated over time such as a conversation. Audio 113 may include conversations of the person within interior 405 of vehicle 400 or otherwise proximate vehicle 400. Audio 113 may include various noises or sounds generated by activities of the person within interior 405 or otherwise proximate vehicle 400 such as sounds associated with the opening or closing of compartments, moving of papers or other materials, operating of controls of vehicle 400, locking or unlocking locks associated with vehicle 400, or breaking of glass or other parts of vehicle 400.

A unit ID 107 (see FIG. 2) is associated with unit 20. The unit ID 107 has electronic form and designates the unit 20 and the vehicle 400 within which the unit 20 is placed. The unit ID 107 may include, for example, identification of the unit 20 and the vehicle identification number (VIN) of vehicle 400, license tag number, QR code, or other information that identifies vehicle 400.

Vehicle monitoring system 10 includes identification 40, as illustrated in FIG. 1. Identification 40, as illustrated, is associated uniquely with person 41, and identification 40 is configured to identify the identity 125 of person 41. The person 41 may be an employee of the vehicle service center 430. Identification 40 may be adapted to be carried on or about the person 41. For example, the identification 40 may be adapted to be carried by a strap about a neck of the person 41, may be carried by a clip attached to the shirt pocket of the person 41, may be carried by being attached to the clothing of the person 41, or may be carried within a wallet, pocket, or handbag of the person 41. Identification 40 may be formed as a plastic card, and various straps, clips, pins, fasteners, and so forth may be disposed about identification 40 for attachment on or about person 41, in various implementations.

Identification 40 identifies the identity 125 of person 41, and identification 40 preferably includes photo 42 of person 41, identifying information 44, and a tag 46, in this implementation. Identifying information 44 may, for example, include the name of the person 41, an identifying number such as an employee number, military serial number, social security number associated uniquely with the person 41, or biometric information (e.g. hair color, gender, race, eye color, fingerprint, retinal scan) of the person 41. The identifying information 44 may be in the form of human readable alphanumeric characters, machine-readable code such as bar code, QR code, or combinations thereof.

Tag 46 may be a radio-frequency identification (RFID) tag that employs the wireless non-contact use of radio-frequency electromagnetic fields to transfer tag data 47 contained within the tag 46, in some implementations. In other implementations, tag 46 may be configured as an optical identification (OPID) tag that may, for example, employ reflection, photovoltaic components, or infrared light emitting diodes for the wireless non-contact transfer of tag data 47 contained within the tag 46.

Tag data 47 may include identifying information, such as identifying information 44, that identifies the identity 125 of person 41. Tag data 47 may include an access code 111 that authorizes access by person 41 to a particular locale such as interior 405 of vehicle 400. Unit 20 may include tag reader 29 adapted to read tag data 47 of tag 46. Tag data 47 is communicated wirelessly via communication pathway 49 from tag 46 of identification 40 to tag reader 29 of unit 20, in this implementation.

As illustrated in FIG. 1, vehicle monitoring system 10 includes controller 60 adapted to communicate with unit 20 via communication pathway 69, which is wireless at least in part. Controller 60 is positioned exterior 407 of vehicle 400, as illustrated, and controller 60 may be positioned some distance away from the vehicle 400. As illustrated, controller 60 is located generally within vehicle service center 430. In other implementations, controller 60 may be located at some location remote from vehicle service center 430, and controller 60 may be kept by the vehicle owner. The vehicle owner may monitor vehicle 400 using controller 60 while the vehicle owner is remote from the vehicle.

Communication pathway 69 between unit 20 and controller 60 may include radio frequency communication, local area network communication, wide area network communication, Internet communication, and may further include telephonic communication whether wired or wireless. Communication pathway 69 may conform, at least in part, to various standards such as, for example, IEEE 802.11, Bluetooth, CDMA, GSM used in Internet or cellular communications.

Unit 20 may communicate the detection by sensor 26 of signal 120 indicative of the presence of a person, such as person 41, within interior 405 of vehicle 400 to controller 60. With identification 40 carried about person 41, the identity of person 41 may be determined from tag data 47 of tag 46 by either unit 20 or controller 60 when person 41 enters the interior 405 of vehicle 400. Unit 20 may receive tag data 47 from tag 46 and unit 20 may communicate tag data 47 to controller 60. Unit 20 may communicate an alarm condition 105 in which tag data 47 is not detected to controller 60, and the alarm condition 105 may be so communicated in conjunction with the detection of the signal 120 indicative of the presence of a person within the interior 405 of vehicle 400 by sensor 26. Accordingly, alarm condition 105 may be indicative of an unauthorized person within the interior 405 of the vehicle 400.

Unit 20 may communicate the image 103 of the interior 405 captured by camera 28 to controller 60. The capture of the image 103 by the unit 20 and communication of the image 103 from unit 20 to controller 60 may be triggered by the detection of the signal 120 indicative of the presence of a person within the interior 405 of vehicle 400. Unit 20 may communicate the audio 113 captured by microphone 33 to controller 60. The capture of the audio 113 by microphone 33 of unit 20 and communication of the audio 113 from unit 20 to controller 60 may be triggered by the detection of the signal 120 indicative of the presence of a person within the interior 405 of vehicle 400. Alternatively, the capture of the image 103 and/or the capture of the audio 113 and the communication of the image 103 and/or the audio 113 from unit 20 to controller 60 may be manually triggered remotely by a person in possession of the controller 60, such as a service center manager or the vehicle owner. Unit 20 may store copies of the image 103 and the audio 113 on unit 20. Unit 20 may include memory, microprocessor, clock, communication electronics that enable communication with controller 60 via pathway 69, communication electronics that enable communication with tag 46 to receive tag data 47 from tag 46 via pathway 49, data storage devices for, inter alia, the storage of the image 103, audio 113, and tag data 47, image processing components, data processing components, timers, A/D converters, and other electronic components, as would be recognized by those of ordinary skill in the art upon study of this disclosure.

Controller 60 may include screen 62 to display the image 103 of interior 405 captured by camera 28 and a speaker 127 for the broadcast of audio 113. The image 103 may be displayed upon screen 62 in real time concurrent with the capture of the image 103 by camera 28. The image 103 may be displayed upon screen 62 at some later time subsequent to the time of capture of the image 103 by camera 28. The audio 113 may be broadcast by speaker 127 in real time concurrent with the capture of audio 113 by microphone 33. The audio 113 may be broadcast by speaker 127 at some later time subsequent to the capture of audio 113 by microphone 33. Image 103 may be displayed concurrent with the broadcast of audio 113, or the image 103 may be displayed apart from the broadcast of the audio 113.

In some implementations, the vehicle monitoring system 10 may be entirely controlled by the vehicle owner. In such implementations, the controller 60 may be implemented in software operably received by, for example, a cellular telephone, tablet computing device, or other such device to allow the vehicle owner to monitor the interior 405 of the vehicle 400. A QR code may be provided to link the controller 60 with the unit 20. The vehicle service center may rent the controller 60 to the vehicle owner.

In other implementations, the vehicle monitoring system 10 may be controlled by the vehicle service center, for example, by a manager of the vehicle service center. In such implementations, the controller 60 may allow access by vehicle owner so that the vehicle owner may monitor the interior 405 of the vehicle 400 through controller 60 by using the vehicle owner's cellular telephone or tablet computing device. An access code may be provided to the vehicle owner to allow the vehicle owner to access the controller 60 using the vehicle owner's cellular telephone or tablet computing device. The access code may be provided by bar code or QR code, in various implementations. The controller 60 may be positioned in a waiting area, in some implementations, to allow the vehicle owner to monitor the interior of the vehicle while awaiting servicing of the vehicle.

In yet other implementations, the vehicle service center may own the vehicle (e.g. car dealership, fleet parking area) and the manager of the vehicle service center may use the vehicle monitoring system to monitor vehicles in the inventory.

Controller 60 may include input device 63 to allow for the input of commands to control the operation of vehicle monitoring system 10. The input device 63 may be, for example, a keyboard, joystick, virtual controller such as a touchscreen, or control panel, in various implementations. The input device 63 may be used, for example, to control camera 28 by focusing camera 28, changing the angle of view of camera 28, directing the orientation of camera 28, and so forth. In various implementations, the vehicle owner or the manager of the controller 60 may operate controller 60 including input device 63. Controller 60 may be password protected, dongle protected, or otherwise protected to control access to the controller 60, in various implementations.

In some implementations, controller 60 may comprise a computer with controller 60 implemented by software operatively received by the computer. In other implementations, controller 60 may comprise a specialized piece of equipment configured for the purposes disclosed herein. In still other implementations, controller 60 may comprise a cellular telephone or tablet with software operatively received thereupon that implements controller 60. Controller may include memory, processor, clock, communication electronics that enable communication with unit 20 via pathway 69, data storage devices for, inter alia, the storage of the image 103, audio 113, and tag data 47, as would be recognized by those of ordinary skill in the art upon study of this disclosure.

Figure 2:
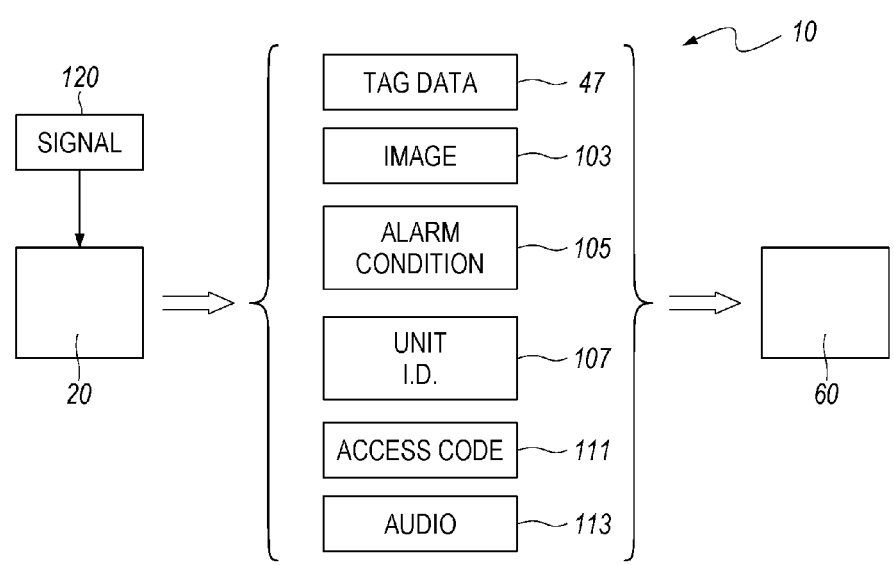
FIG. 2 illustrates diagrammatically exemplary interactions between various portions of the exemplary implementation of the vehicle monitoring system of FIG. 1.

FIG. 2 illustrates further the interaction between unit 20 and controller 60. As illustrated in FIG. 2, controller 60 detects signal 120 indicative of the presence of the person within interior 405 of vehicle 400. Upon detection of signal 120, unit 20 may transmit tag data 47, image 103, alarm condition 105, unit ID 107, access code 111, and/or audio 113 from unit 20 to controller 60. Unit 20 may store tag data 47, image 103, alarm condition 105, unit ID 107, access code 111, and/or audio 113 on unit 20. Controller 60 may, for example, display image 103 and identity 125 on screen 62, and controller 60 may broadcast audio 113. Controller 60 may interact with several units, such as unit 20, simultaneously, and each of the several units may be located in a separate vehicle. In such implementations, the unit ID, such as unit ID 107, designates a particular vehicle in which a particular unit is located. Controller 60 may act as a central hub for all vehicular units, such as unit 20, and store information such as access control lists, status logs, audio, visual images, video, and other data.

Figure 3:
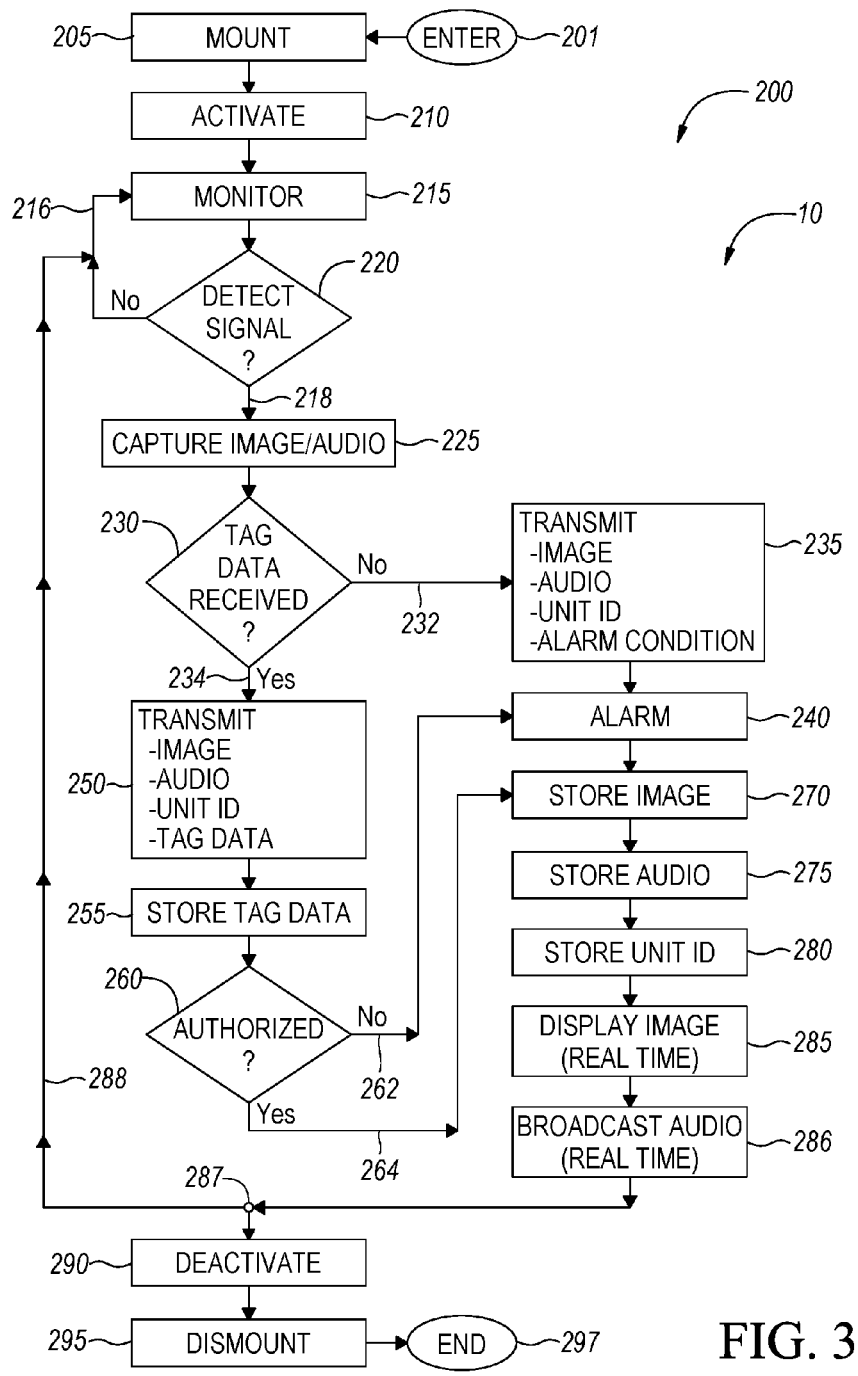
FIG. 3 illustrates by process flow chart exemplary operations of the vehicle monitoring system of FIG. 1.

A method of use 200 of vehicle monitoring system 10 is described in FIG. 3. As illustrated in FIG. 3 method of use 200 is entered at step 201. A unit, such as unit 20, may be activated at step 201. At step 205, the unit is mounted within an interior, such as interior 405, of vehicle 400. The unit may be mounted upon a dashboard, such as dashboard 412, of the vehicle. If necessary, the unit may be connected to the vehicle electrical system of the vehicle. The vehicle owner may mount the unit to the dashboard in conjunction with turning the vehicle over to the care of a vehicle service center, such as vehicle service center 430.

If not activated yet, the unit is activated at step 210. A controller, such as controller 60, may be activated at step 210, and a communication pathway, such as communication pathway 69, may be established between the unit and the controller. Activating at step 210 may include powering up, initiating software, adjusting camera angle, and taking other actions to enable operation of a vehicle monitoring system, such as vehicle monitoring system 10. A unit ID, such as unit ID 107, may be transmitted from the unit to the controller to identify the unit to the controller and to identify the vehicle within which the unit is placed (the vehicle associated with the unit) to the controller. The unit may query the controller for authorized user access codes and the controller may transfer access codes to the unit. The vehicle owner, an employee of the vehicle service center such as a manager, or both may activate the unit and the controller per step 210. Activation of the vehicle monitoring system preferably occurs at the time the vehicle owner transfers control of the vehicle to the vehicle service center, thus providing the vehicle owner with immediate access to the interior monitoring of the vehicle. Step 210 may further include configuring identification, such as identification 40, including configuring tag data of a tag, such as tag data 47 of tag 46.

At step 215, the unit monitors the interior, such as interior 405, of the vehicle for a signal, such as signal 120, indicative of the presence of a person, such as person 41, within the interior of the vehicle. Step 220 checks for the signal indicative of the presence of the person. If no signal is detected at step 220, method of use passes from step 220 back to step 215 as indicated by arrow 216. Method of use 200 loops between step 215 and step 220 periodically thereby periodically monitoring the interior of the vehicle at step 215 and checking for the signal indicative of the presence of the person at step 220, as illustrated.

Upon detection of the signal indicative of the presence of the person at step 220, method of use 200 passes from step 220 to step 225, as indicated by arrow 218, to capture image(s) and audio from the interior of the vehicle. At step 230, the unit attempts to receive tag data from the tag secured to the identification that may be carried by the person.

If tag data is not received at step 230, method of use 200 passes from step 230 to step 235, as indicated by arrow 232. The unit not receiving tag data indicates the person lacks identification and may be someone who is not authorized to be in the vehicle. At step 235, the unit transmits the image, an alarm condition, such as alarm condition 105, and a unit ID, such as unit ID 107, to the controller. Prompted by receipt of the alarm condition, the controller issues an alarm at step 240. The alarm indicates that a person who lacks authorization is accessing the interior of the vehicle.

If tag data is received at step 230, method of use 200 passes from step 230 to step 250, as indicated by arrow 234. At step 250, the unit transmits the image, audio, the tag data, and the unit ID to the controller.

Method of use 200 stores the tag data, at step 255.

At step 260, method of use 200 checks the access code, such as access code 111, which is included in the tag data, in this implementation. Method of use 200 checks the access code to determine whether or not the person is authorized to enter the interior of the vehicle. If the person is not authorized to enter the interior of the vehicle, method of use 200 branches from step 260 to step 240, as indicated by arrow 262, thereby causing the controller to issue the alarm per step 240.

If the person is authorized to enter the vehicle, method of use 200 branches from step 260 to step 270, as indicated by arrow 264.

At step 270, the image is stored. At step 275, the audio is stored. At steps 270, 275, time information indicative of the time of detection of the signal and image/audio capture is stored in association with the image/audio. The unit ID is stored at step 280. The image is displayed by the controller at step 285, and the audio is broadcast by the controller at step 286. It is contemplated that tag data, image, audio, unit ID, alarm conditions, signal(s), and times associated with each are retained by the vehicle monitoring system for later analysis, for example, during a criminal investigation, legal proceeding, or disciplinary action. Various features that maintain the integrity according to recognized standards of evidence of the tag data, image, audio, unit ID, alarm conditions, signal(s), and times associated with each may be included in the vehicle monitoring system.

Method of use 200 advances from step 286 to branch point 287, and then passes from branch point 287 back to step 215 as indicated by arrow 288. Continued detection of the signal, per steps 215, 220, causes method of use 200 to pass from step 220 along path 218 to step 225 and the steps subsequent to step 225 to branch point 287. If the signal is no longer detected, method of use 200 will linger in the loop of steps 215, 220. Cessation of the signal at step 215 may indicate that the person has withdrawn from the interior of the vehicle.

Method of use 200 may pass from branch point 287 to step 290, and the unit, controller, and communication pathways are deactivated at step 290. Deactivation of the vehicle monitoring system preferably occurs in the presence of the vehicle owner, thus providing the vehicle owner with continuous access to the interior monitoring of the vehicle while the vehicle is in the control of the vehicle service center. The unit is dismounted from the vehicle interior at step 295. Method of use 200 terminates at step 297.

The vehicle monitoring system preferably includes one or more sensors that will sound an alarm if the unit malfunctions or is tampered with, for example, if the unit loses power or deactivates prematurely, if the unit is moved, if the vehicle having the unit is moved out of range of the controller, if the camera view is obstructed, and the like.

The unit may be equipped with a GPS tracking feature that is operable to wirelessly transmit the location of the unit in case of theft of the unit or of the vehicle having the unit therein. In addition, if the unit is unable to communicate with the controller, the unit is operable to store data (e.g. tag data, image, audio, unit ID, alarm conditions, etc.) on the unit and, after communication with the controller is reestablished, the unit can transmit the data to the controller.

The foregoing discussion along with the Figures discloses and describes various exemplary implementations. These implementations are not meant to limit the scope of coverage, but instead to assist in understanding the context of the language used in this disclosure. Upon study of this disclosure and the exemplary implementations herein, one of ordinary skill in the art may readily recognize that various changes, modifications and variations can be made thereto without departing from the spirit and scope of the inventions as described and claimed herein.

The invention claimed is:

1. A system for monitoring an interior of a vehicle, comprising:
   a) an identification device adapted to be carried by an individual, said identification device comprising data;
   b) a vehicular unit adapted for mounting within said interior of said vehicle, said unit comprising a sensor for detecting the presence of a person within said interior of said vehicle, a camera for capturing images of said interior of said vehicle, a microphone for capturing sounds within said interior of said vehicle, and a reader for detecting said identification device and reading said data on said identification device; and
   c) a controller adapted for wireless communication with said unit from a remote location, said controller comprising a display for displaying images and a speaker for broadcasting sounds;
   d) wherein said sensor is operable to detect the presence of a person within said interior of said vehicle, wherein said unit is further operable to activate said camera to capture images of said interior of said vehicle when the presence of the person is detected by said sensor, wherein said unit is further operable to activate said microphone to capture sounds within said interior of said vehicle when the presence of the person is detected by said sensor, wherein said unit is further operable to activate said reader to search for said identification device within said interior of said vehicle when the presence of the person is detected by said sensor;
   e) wherein said unit is operable to activate an alarm if said identification device is not detected within said interior of said vehicle when the presence of the person is detected by said sensor;
   f) wherein said unit is operable to activate said reader to read said data on said identification device if said identification device is detected within said interior of said vehicle;
   g) wherein said unit is operable to transmit said images from said camera, said sounds from said microphone, said data from said identification device, and an alarm status to said controller;
   h) wherein said controller is operable to display said images from said camera in real time concurrent with the capture of said images by said camera, broadcast said sounds from said microphone in real time concurrent with the capture of said sounds by said microphone, and display said alarm status to a user of said controller;
   i) wherein said controller is operable to remotely control said camera by focusing said camera, changing the angle of view of said camera, or directing the orientation of said camera.

2. A system according to claim 1, wherein said data includes an access code.

3. A system according to claim 2, wherein said controller includes authorized access codes.

4. A system according to claim 3, wherein said controller is operable to transmit said authorized access codes to said unit and said unit is operable to store said authorized access codes from said controller.

5. A system according to claim 3, wherein said unit is operable to compare said access code from said identification device with said authorized access codes from said controller and activate an alarm if said access code from said identification device is not found within said authorized access codes.

6. A system according to claim 1, wherein said unit is operable to store said images from said camera and said sounds from said microphone, wherein said unit is further operable to store time information indicative of the time of capture of said images and the time of capture of said sounds.

7. A system according to claim 1, wherein said controller is operable to store said images from said camera and said sounds from said microphone, wherein said controller is further operable to store time information indicative of the time of capture of said images and the time of capture of said sounds.

8. A system for monitoring an interior of a vehicle, comprising:
a) an identification device adapted to be carried by an individual, said identification device comprising data;
b) a vehicular unit adapted for mounting within said interior of said vehicle, said unit comprising a sensor for detecting the presence of a person within said interior of said vehicle, a camera for capturing images of said interior of said vehicle, and a reader for detecting said identification device and reading said data on said identification device; and
c) a controller adapted for wireless communication with said unit from a remote location, said controller comprising a display for displaying images;
d) wherein said sensor is operable to detect the presence of a person within said interior of said vehicle, wherein said unit is further operable to activate said camera to capture images of said interior of said vehicle when the presence of the person is detected by said sensor, wherein said unit is further operable to activate said reader to search for said identification device within said interior of said vehicle when the presence of the person is detected by said sensor;
e) wherein said unit is operable to activate an alarm if said identification device is not detected within said interior of said vehicle when the presence of the person is detected by said sensor;
f) wherein said unit is operable to activate said reader to read said data on said identification device if said identification device is detected within said interior of said vehicle;
g) wherein said unit is operable to transmit said images from said camera, said data from said identification device, and an alarm status to said controller;
h) wherein said controller is operable to display said images from said camera in real time concurrent with the capture of said images by said camera and display said alarm status to a user of said controller.

9. A system according to claim 8, wherein said data includes an access code.

10. A system according to claim 9, wherein said controller includes authorized access codes.

11. A system according to claim 10, wherein said controller is operable to transmit said authorized access codes to said unit and said unit is operable to store said authorized access codes from said controller.

12. A system according to claim 10, wherein said unit is operable to compare said access code from said identification device with said authorized access codes from said controller and activate an alarm if said access code from said identification device is not found within said authorized access codes.

13. A system according to claim 8, wherein said controller is operable to remotely control said camera by focusing said camera, changing the angle of view of said camera, or directing the orientation of said camera.

14. A system according to claim 8, wherein said unit is operable to store said images from said camera, wherein said unit is further operable to store time information indicative of the time of capture of said images.

15. A system according to claim 8, wherein said controller is operable to store said images from said camera, wherein said controller is further operable to store time information indicative of the time of capture of said images.

16. A system according to claim 8, wherein said unit further comprises a microphone for capturing sounds within said interior of said vehicle and said controller further comprises a speaker for broadcasting sounds.

17. A system according to claim 16, wherein said unit is operable to activate said microphone to capture sounds within said interior of said vehicle when the presence of the person is detected by said sensor, wherein said unit is further operable to transmit said sounds from said microphone to said controller, wherein said controller is operable to broadcast said sounds from said microphone to a user of said controller.

18. A system according to claim 16, wherein said unit is operable to store said sounds from said microphone, wherein said unit is further operable to store time information indicative of the time of capture of said sounds.

19. A system according to claim 16, wherein said controller is operable to store said sounds from said microphone, wherein said controller is further operable to store time information indicative of the time of capture of said sounds.

* * * * *